July 1, 1958  D. H. KEISER, JR  2,840,906
SHEARING DEVICE
Filed Aug. 30, 1957  3 Sheets-Sheet 1
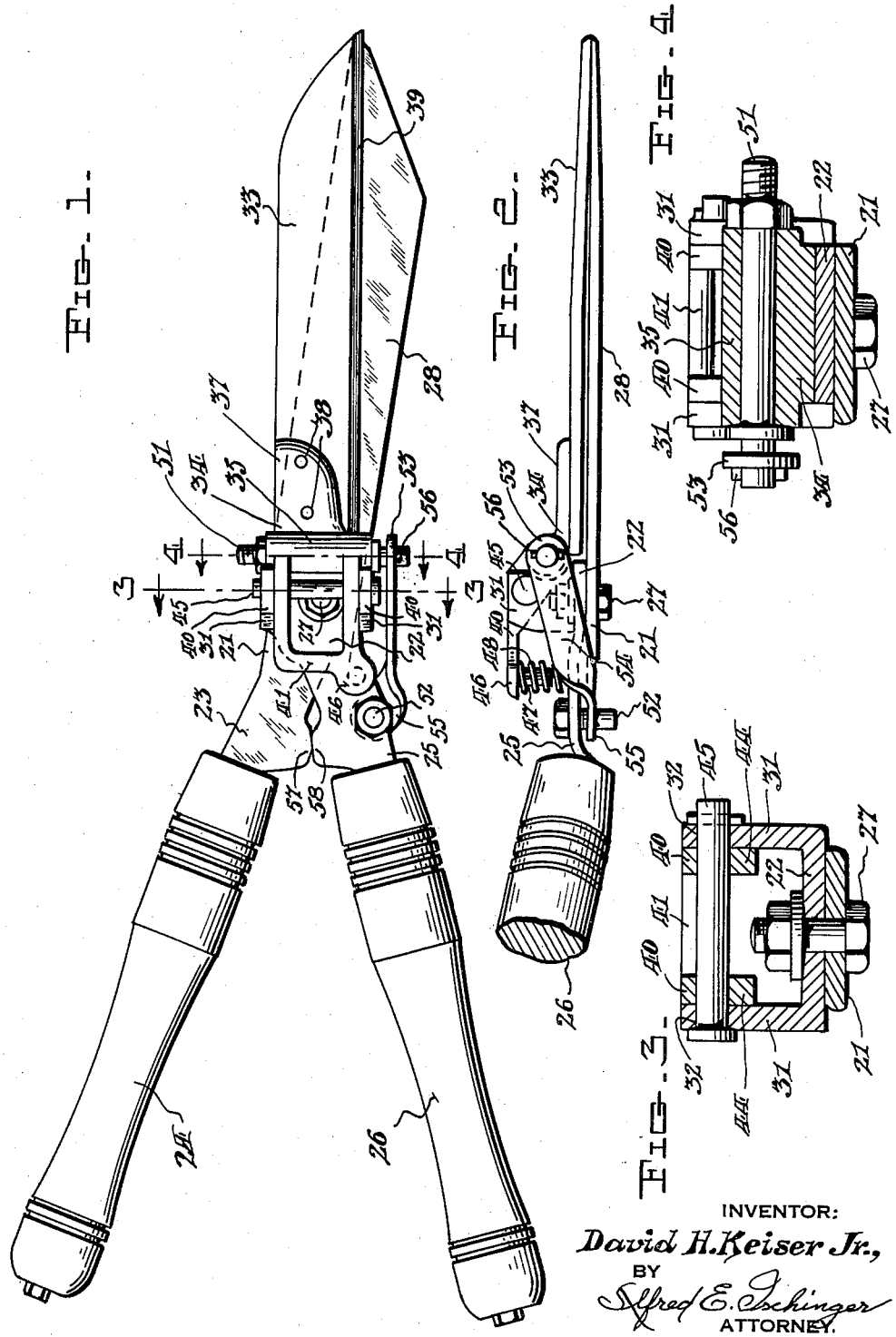
INVENTOR:
David H. Keiser Jr.,
BY
Alfred E. Ischinger
ATTORNEY.

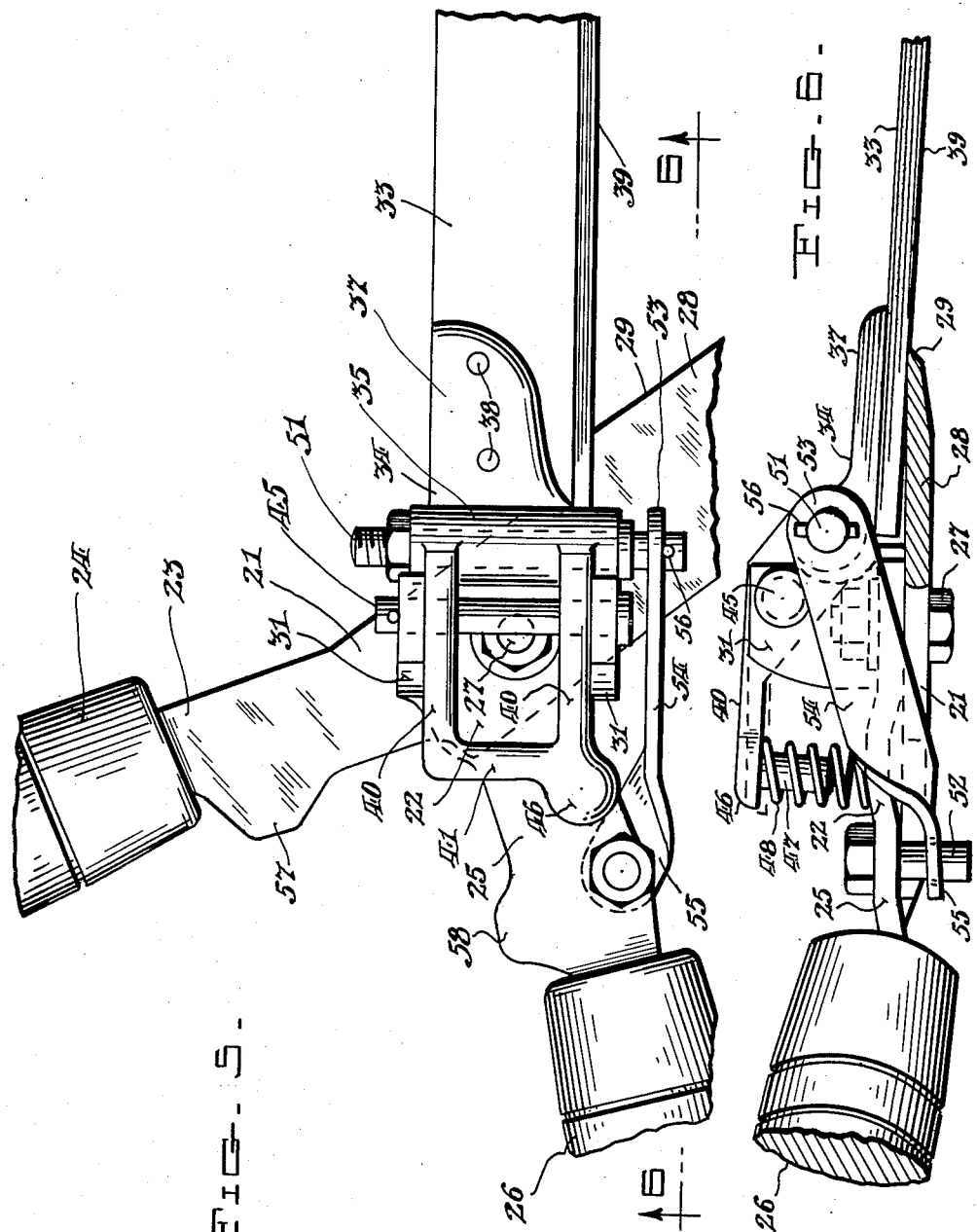

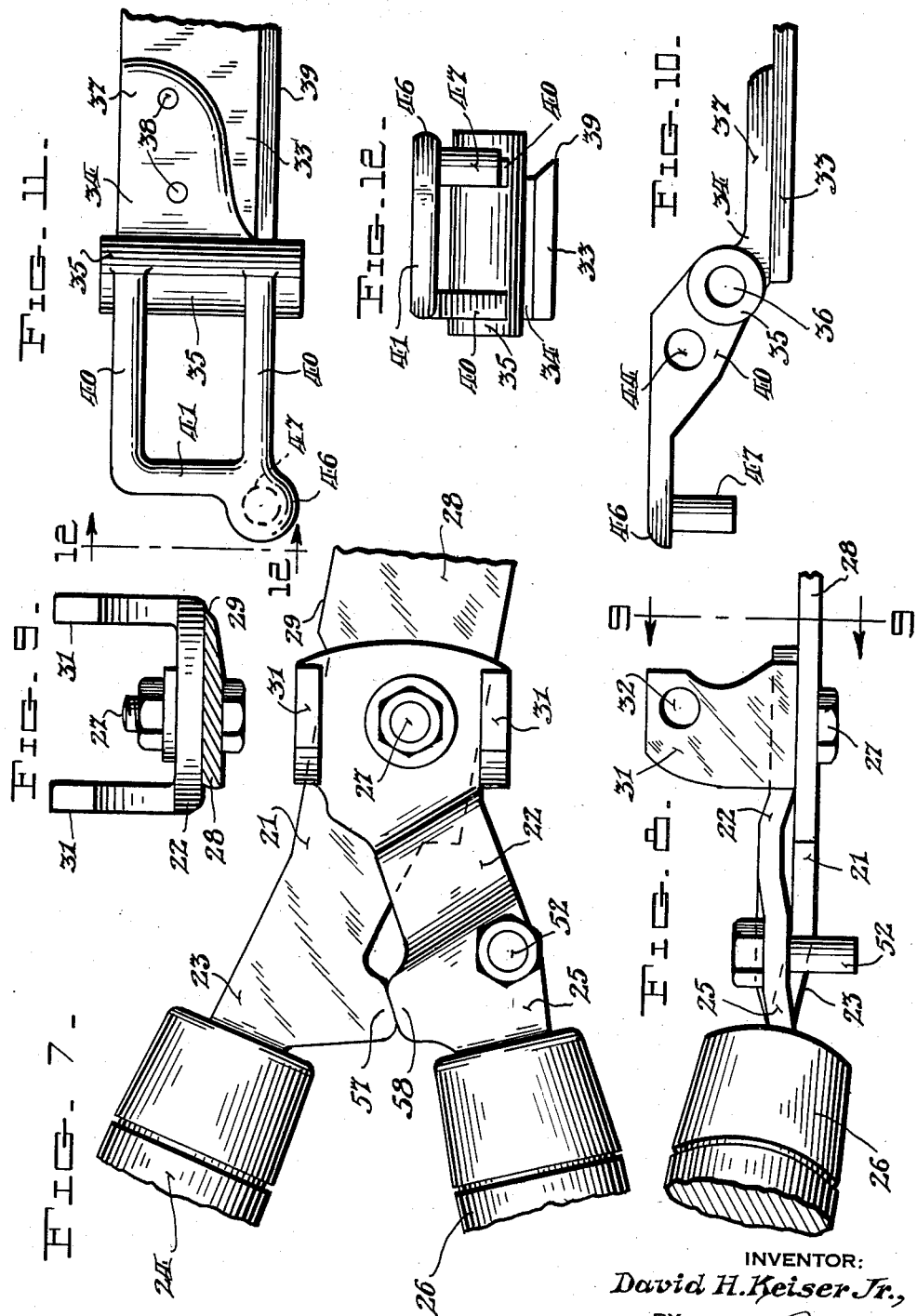

United States Patent Office 2,840,906
Patented July 1, 1958

2,840,906

SHEARING DEVICE

David H. Keiser, Jr., West Lawn, Pa.

Application August 30, 1957, Serial No. 681,307

5 Claims. (Cl. 30—268)

This invention relates to shearing devices, and more specifically to improvements particularly applicable to the types of shears shown in my prior Patents No. 2,281,977 of May 5, 1942, No. 2,407,237 of September 10, 1946, No. 2,607,114 of August 19, 1952, and No. 2,661,534 of December 8, 1953. My invention is directed to the type of shearers known as hedge shears in which one cutting blade is fixed and the other is movable—and my improvements relate more specifically to a simplified pivotal connection between the shears for insuring a proper cooperating pressure engagement of the blade cutting edges during their closing movement to provide a clean cut and to prevent binding and clogging of the blades. It will be understood that the improvements of the present invention may be applied to other types of shears, such as lawn trimmers, grass clippers, edgers, and the like.

An outstanding disadvantage of most of the conventional types of shears is that there is a great tendency for the cutting edges of the blades to separate when they are brought together in contact with the materials to be cut and to be clogged with uncut material, therefore not forming a clean cut or shearing action. While attempts have been made to overcome this tendency, and to bring the blades close together when brought into contact with the material being cut, these attempts have not generally met with success and in most instances have resulted in very complicated and expensive constructions.

One object of my invention is to provide a novel device of the type indicated which has certain structural and functional features of advantages over similar devices of the prior art.

Another object of the invention is to provide such a device having novel means for pivotally mounting one of the blades thereof on a handle extension arranged to effect a positive shearing movement of said blade during its operation relative to the other blade.

Another object of the invention is to provide new and improved shears in which the blades are held in positive effective shearing contact during their entire shearing movement.

A further object of the invention is to provide new and improved shears in which the operating means for the blades are so constructed as to prevent separation of the blades by the material or object during the cutting action of the device.

A still further object of the invention is to provide new and improved shears having a more positive controlled cutting action over similar devices of the prior art.

Still another object of the invention is to provide new and improved shears having longer wearing qualities and easier operation characteristics over prior similar devices.

An additional object of the invention is to provide shears of an improved construction which can be inexpensively constructed with readily produced standard parts simply and economically assembled.

With these and other objects in view, which will become readily apparent from the following detailed description of the various unique, practical and illustrative shear improvements shown in the accompanying drawings, the present invention comprises the novel shears, cutting blade units, elements, features of construction and arrangement of parts in cooperative relationship, as more particularly indicated and defined by the hereto appended claims.

In the accompanying drawings:

Figure 1 is a plan view of shears constructed according to the present invention with the cutting blades in closed position;

Fig. 2 is a side elevation of the structure shown in Fig. 1;

Fig. 3 is an enlarged vertical transverse section taken along the line 3—3 of Fig. 1;

Fig. 4 is an enlarged vertical transverse section taken along the line 4—4 of Fig. 1;

Fig. 5 is an enlarged plan view of a portion of the shears with the cutting blades in wide open position;

Fig. 6 is a vertical longitudinal section taken along the line 6—6 of Fig. 5;

Fig. 7 is a detail plan view of a portion of the shears showing the pivotal connection of the two operating handles, certain parts including one of the cutting blades being removed;

Fig. 8 is a side elevation of the structure shown in Fig. 7;

Fig. 9 is a vertical transverse section taken along the line 9—9 of Fig. 8;

Fig. 10 is a side elevation of one of the cutting blades and associated structure removed from the shears;

Fig. 11 is a plan view of the structure shown in Fig. 10; and

Fig. 12 is an elevation of the structure shown in Figs. 10 and 11 as seen from the line 12—12 of Fig. 11.

Referring to the drawings, the new and improved shears comprise two arms 21 and 22. The arm 21 has a shank end 23 provided with an operating handle 24, and the arm 22 has a shank end 25 provided with an operating handle 26.

The two arms 21 and 22 are pivotally connected together by means of a bolt 27, the arm 22 being superposed on the arm 21 in the manner shown best in Figs. 7 and 8 and being freely movable relative thereto in a horizontal plane in well known manner.

Extending outwardly from the arm 21 and preferably constructed integrally therewith, is a blade 28 having the usual cutting edge 29.

It will be understood that the arm 21, handle 24, and blade 28 constitute what is known in the art as the fixed blade of the shears.

The arm 22 is formed along its two side edges with upstanding ears 31, 31, each of said ears being provided with an aperture 32.

In the present improvements I employ a novel construction of the cooperating or movable blade 33 and different means from that of my aforesaid patents for mounting the same, and as shown, these comprise a bracket member 34 carried by said blade 33 (see Figs. 10 and 11) and having operative connection with the arm 22 in the manner to be hereinafter more fully described.

The bracket member 34 has a sleeve portion 35 formed transversely thereof and arranged intermediately of its two ends, said sleeve being provided with an aperture 36 arranged lengthwise thereof.

Extending forwardly from the sleeve portion 35 of the bracket 34 and preferably disposed in a plane below said sleeve, is an arm 37 which is rigidly connected to the rear end portion of the blade 33 by means of rivets 38, or the like suitable fastening means.

The blade 33 is provided with a cutting edge 39 cooperating with the cutting edge 29 of the fixed blade 28, and as shown in Fig. 2, the upper movable blade 33 desirably having a usual downward curvature insuring better cutting action with the fixed blade 28 as heretofore and well known.

Extending rearwardly and inclined upwardly from the sleeve portion 35 of the bracket 34, is a pair of legs, 40, having their rear end portions disposed in a plane a suitable distance above the sleeve portion 35 of the bracket, and connected at their ends remote from the sleeve by a cross bar 41. Thus, the bracket is formed with a lower forwardly extending section defined by the member 37, an upper rearwardly extending section defined by the rear end portions of the legs 40, and an intermediate connecting section having the sleeve 35 formed therewith.

The legs 40 are arranged in parallel relationship with respect to each other and are spaced apart a distance substantialy equal to the distance between the ears 31 of the arm 22, so that the legs 40 of the bracket member 34 can be positioned between the ears 31 in the manner shown best in Fig. 1.

The legs 40 are formed with aligned apertures 44 arranged to register with the apertures 32.

A pivot pin 45 is mounted in the aligned apertures of the ears 31 and the bracket legs 40 so as to pivotally support the cooperating blade 33 and its bracket 34 in free vertical independent movement on the horizontally turnable arm 22 of the shears.

The construction and arrangement of the parts is such that the outer side surfaces of the legs 40 are disposed against the inner side surfaces of the ears 31 of the arm 22, so that when the handles 24 and 26 are operated to open and close the shear blades, the swinging movement of the handle 26 and its arm 22 will be imparted by the ears 31 and the legs 40 to the blade 33, whereby said blade is caused to move horizontally across the lower blade 28. Thus, the manner in which the handles 24 and 26 are pivotally connected by the bolt 27 provides flat-wise opening and closing shearing movements of the blades 28 and 33, while the pin 45 provides a separate transverse pivot forming a bearing for the upper blade 33 for independent swing thereof at right angles to its horizontal shearing movement.

The end portion of the bracket 34 at the junction of the cross bar 41 with one of the legs 40, is formed with a projecting spring seating lug 46 having a spring mounting pin 47 depending therefrom.

A spring 48 engaging between the lug 46 and the arm 22 and encircling the pin 47, tensions the blade 33 so as to yieldingly seat it against the blade 28 at all times during the opening and closing of said blades.

It will be noted that the sleeve 35 of the bracket 34 is arranged forwardly and in a plane below the connection of said bracket with the ears 31 provided by the pivot pin 45.

Mounted in the aperture 36 of the sleeve 35, is a shaft 51, and carried by a portion 25 of the arm 22 is a stud 52. The shaft 51 engages an opening in one end 53 of a twisted link 54. The other end 55 of the link 54 is on a substantially horizontal plane and is provided with an opening so that it may be connected with the stud 52. A pin 56 mounted in the outer portion of the shaft 51 is adapted to retain the forward end 53 of the link 54 on said shaft.

The stud 52 should have sufficient length to provide means for supporting the rear end 55 of the link 54 thereon and at the same time enable the end portion 55 of said link to move upwardly and downwardly thereon a suitable distance during operation of the shears, as will be hereinafter more fully described.

When the shear blades 28 and 33 are in the position shown in Figs. 1 and 2, an extension 57 on the arm 21 of the fixed blade 28 contacts an extension 58 on the arm 22 of the movable blade unit, and thereby limits the closing movement of the movable blade 33 with respect to the fixed blade 28.

Due to the manner in which the movable blade 33 is constructed with a downward curvature heretofore referred to, the outer end portion of the blade rests on the outer end portion of the fixed blade 28, and the remaining portion of the blade 33 will be disposed in spaced relationship above the blade 28, so that the cutting edge 39 of the blade 33 will be free of contact with the cutting edge 29 of the blade 28 except at the extreme outer end of the shears. The spring 48 retains the tip of the blade 33 in intimate contact with the fixed blade 28 in cooperation with the pulling action exerted by the link 54 on the movable blade unit.

Due to the construction and arrangement of the parts, when the shear blades are closed, the end 55 of the link 54 is normaly disposed on the stud 52 directly beneath the underside of the arm 22, as seen best in Fig. 2. On the other hand, when the handles 24 and 26 are operated to swing the shear blades toward wide open position, the end 55 of the link 54, which is movably engaged on the stud 52, slides down along the stud 52 toward the position shown in Fig. 5, in positionally self-adjusting manner, and thereby opens the gap between the underside of the arm 22 and the end 55 of the link 54, as shown in Fig. 6.

When handles 24 and 26 are operated to swing the shear blades from wide open toward closed position, the end 55 of the link 54 slides upwardly on the stud 52, in positionally self-adjusting manner, from the position shown in Fig. 6 toward the position shown in Fig. 2. When the blades are wide open it will be noted that the cutting edge 29 of the fixed blade 28 contacts the cutting edge 39 at the inner end portion of the movable blade 33.

It will be understood that during operation of the shears, the cutting edge 39 of the upper movable blade 33 is caused to progressively contact the cutting edge 29 of the fixed blade 28, and that the link 54 is provided solely for the purpose of tightening the two cutting edges of the two blades irrespective of varying resistance offered by the material being sheared.

In my above referred to prior patents, shears of the general type are disclosed but without the specific blade mounting and actuating means as disclosed herein which renders the present shears capable of more ready manufacture and at the same time makes them much easier to assemble and use.

From the foregoing description of the construction shown in the drawings, it is believed the nature of the new and improved shearing mechanism may be readily apparent, as well as the advantages resulting therefrom of an assured cutting efficiency free of binding or clogging, and with a minimum of friction and wear, and less tiresome to operate. The particular construction shown and described may of course be used with other types of shears, than the hedge shears herein described.

It will also be understood that the shearing device improvements specifically shown and described, can be changed and modified in various ways without departing from the invention herein disclosed, and more particularly defined by the hereto appended claims.

I claim:

1. Shears including a lower arm with a fixed blade extending forwardly therefrom, said fixed blade having a cutting edge, an upper arm having a forwardly extending portion resting on the lower arm, a bolt pivotally connecting the upper arm with the lower arm whereby said upper arm is arranged to swing in a substantially horizontal plane with respect to the fixed blade, a pair of ears upstanding from the portion of the upper arm adjacent to the portion thereof which is pivotally connected with the lower arm, a pivot pin mounted in aligned apertures in said ears and arranged transversely of said upper arm, a bracket having a lower forwardly extending arm with a movable blade fixed thereto, said movable blade having a cutting edge arranged to engage the cutting edge of the fixed blade, a pair of spaced apart substantially parallel legs extending from said bracket, said pivot pin engaging an aperture formed in each leg of said bracket whereby said bracket and the movable blade carried thereby are pivotally supported from said ears for vertical movements upwardly and downwardly with respect to said fixed blade, and means interposed between said upper arm and said bracket arm acting on the bracket for urging the movable blade in a direction toward said fixed blade whereby the cutting edge of the upper movable blade is caused to progressively contact the cutting edge of the fixed blade during operation of the shears.

2. Shears including a lower arm with a fixed blade extending forwardly therefrom, said fixed blade having a cutting edge, an upper arm resting on the lower arm, each of said arms being provided with a shank having a handle mounted thereon, a bolt pivotally connecting the upper arm with the lower arm whereby said upper arm is arranged to swing in a substantially horizontal plane with respect to the fixed blade, a pair of ears upstanding from the portion of the upper arm adjacent to the portion thereof which is pivotally connected with the lower arm, a pivot pin mounted in aligned apertures in the upper portion of said ears and arranged transversely of said upper arm, a bracket having a lower forwardly extending arm with a movable blade fixed thereto, said movable blade having a cutting edge arranged to engage the cutting edge of the fixed blade, a pair of spaced apart substantially parallel legs extending rearwardly and upwardly from the bracket, an intermediate section connecting said legs with said bracket arm and having a sleeve formed thereon, said sleeve being substantially horizontally disposed and being arranged transversely of the bracket, said pivot pin engaging an aperture formed in each leg of said bracket above said sleeve whereby said bracket and the movable blade carried thereby are pivotally supported from said ears for vertical movements upwardly and downwardly with respect to said fixed blade, the outer side surfaces of said legs being disposed against the inner side surfaces of the ears so that when the handles are operated to open and close the blades the swinging movement of the upper arm will be imparted by its ears to the bracket legs whereby the upper blade is caused to move across the lower blade, means acting on said bracket for urging the movable blade in a direction toward said fixed blade whereby the cutting edge of the upper movable blade is caused to progressively contact the cutting edge of the fixed blade during operation of the shears, a shaft mounted in said sleeve, a stud carried by said upper arm, and a link interconnecting said shaft and said stud for tightening the cutting edges of the two blades irrespective of varying resistance offered by the material being sheared.

3. Shears including a lower arm with a fixed blade extending forwardly therefrom, said fixed blade having a cutting edge, an upper arm having a forwardly extending portion resting on the lower arm, each of said arms being provided with a shank having a handle mounted thereon, a bolt pivotally connecting the upper arm with the lower arm whereby said upper arm is arranged to swing in a substantially horizontal plane with respect to the fixed blade, a pair of ears upstanding from the portion of the upper arm adjacent to the portion thereof which is pivotally connected with the lower arm, said ears being arranged in spaced parallel relationship along the longitudinal side edges of the upper arm, a pivot pin mounted in aligned apertures in the upper portion of said ears and arranged transversely of said upper arm, a bracket having a lower forwardly extending arm with a movable blade fixed thereto, said movable blade having a cutting edge arranged to engage the cutting edge of the fixed blade, a pair of spaced apart substantially parallel legs extending rearwardly and upwardly from said bracket, an intermediate section connecting said legs with said bracket arm and having a sleeve formed thereon, said sleeve being substantially horizontally disposed and being arranged transversely of the bracket, said pivot pin engaging an aperture formed in each leg of said bracket above said sleeve whereby said bracket and the movable blade carried thereby are pivotally supported from said ears for vertical movements upwardly and downwardly with respect to said fixed blade, the outer side surfaces of said legs being disposed against the inner side surfaces of the ears so that when the handles are operated to open and close the shear blades, the swinging movement of the upper arm will be imparted by its ears to the bracket legs whereby the upper blade is caused to move across the lower blade, means acting on said bracket for urging the movable blade in a direction toward said fixed blade whereby the cutting edge of the upper movable blade is caused to progressively contact the cutting edge of the fixed blade during operation of the shears, a shaft mounted in said sleeve, a stud carried by said upper arm, and a link interconnecting said shaft and said stud for tightening the cutting edges of the two blades irrespective of varying resistance offered by the material being sheared, said link being positionally self-adjustable.

4. Shears including a lower arm with a fixed blade extending forwardly therefrom, said fixed blade having a cutting edge, an upper arm having a forwardly extending portion resting on the lower arm, each of said arms being provided with a shank having a handle mounted thereon, a bolt pivotally connecting the upper arm with the lower arm whereby said upper arm is arranged to swing in a substantially horizontal plane with respect to the fixed blade, a pair of ears upstanding from the portion of the upper arm adjacent to the portion thereof which is pivotally connected with the lower arm, said ears being arranged in spaced parallel relationship along the longitudinal side edges of the upper arm, a pivot pin mounted in aligned apertures in the upper portion of said ears and arranged transversely of said upper arm, a bracket having a lower forwardly extending arm with a movable blade fixed thereto, said movable blade having a cutting edge arranged to engage the cutting edge of the fixed blade, a pair of spaced apart substantially parallel legs extending rearwardly and upwardly from the bracket, an intermediate section connecting said legs with said bracket arm and having a sleeve formed thereon, said sleeve being substantially horizontally disposed and being arranged transversely of the bracket, said pivot pin engaging an aperture formed in each leg of said bracket above said sleeve whereby said bracket and the movable blade carried thereby are pivotally supported from said ears for vertical movements upwardly and downwardly with respect to said fixed blade, spring means acting on said bracket for urging the movable blade in a direction toward said fixed blade whereby the cutting edge of the upper movable blade is caused to progressively contact the cutting edge of the fixed blade during operation of the shears, a shaft mounted in said sleeve, a stud carried by said upper arm, and a link interconnecting said shaft and said stud for tightening the cutting edges of the two blades irrespective of varying resistance offered by the material being sheared, said link being positionally self-adjustable.

5. Shears including a lower arm with a fixed blade extending forwardly therefrom, said fixed blade having a cutting edge, an upper arm having a forwardly extending portion resting on the lower arm and terminating substantially adjacent to the junction of the rear end of the fixed blade cutting edge with the lower arm, each of said arms being provided with a shank having a handle mounted thereon, a bolt pivotally connecting the forward portion of the upper arm with the lower arm at the rear end of said fixed blade whereby said upper arm is arranged to swing in a substantially horizontal plane with respect to the fixed blade, a pair of ears upstanding from the portion of the upper arm adjacent to the portion thereof which is pivotally connected with the lower arm, said ears being arranged in spaced parallel relationship along the longitudinal side edges of the upper arm, a pivot pin mounted in aligned apertures in the upper portion of said ears and arranged transversely of said upper arm, a bracket having a lower forwardly extending arm with a movable blade fixed thereto, said movable blade having a cutting edge arranged to engage the cutting edge of the fixed blade at a single point along the length thereof during blade closing and opening movements of the shears, a pair of spaced apart substantially parallel legs extending rearwardly and upwardly from said bracket, an intermediate section connecting said legs with said bracket arm and having a sleeve formed thereon, said sleeve being substantially horizontally disposed and being arranged transversely of the bracket, said pivot pin engaging an aperture formed in each leg of said bracket above said sleeve whereby said bracket and the movable blade carried thereby are pivotally supported from said ears for vertical movements upwardly and downwardly with respect to said fixed blade, the outer side surfaces of said legs being disposed against the inner side surfaces of the ears so that when the handles are operated to open and close the shear blades, the swinging movement of the upper arm will be imparted by its ears to the bracket legs whereby the upper blade is caused to move across the lower blade, spring means acting on said bracket for urging the movable blade in a direction toward said fixed blade whereby the cutting edge of the upper movable blade is caused to progressively contact the cutting edge of the fixed blade during operation of the shears, a shaft mounted in said sleeve, a stud carried by said upper arm, and a link interconnecting said shaft and said stud for tightening the cutting edges of the two blades irrespective of varying resistance offered by the material being sheared, one end of which link is movably mounted to enable self-adjustment thereof.

No references cited.